Feb. 4, 1930.  F. O. L. CHORLTON  1,746,029
VARIABLE SPEED DRIVE
Filed Jan. 22, 1929
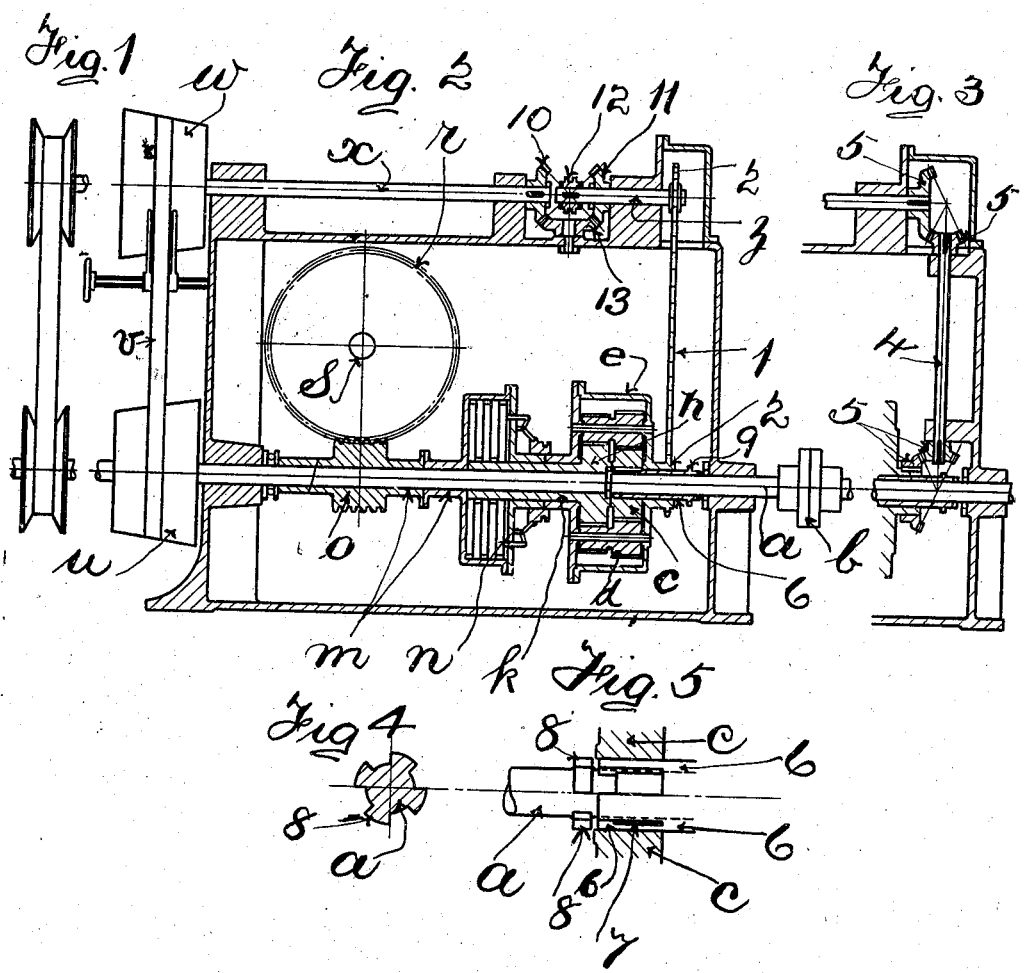
Inventor
Frank Oscar Levi Chorlton.
per: Arthur Gadd
Attorney.

Patented Feb. 4, 1930

1,746,029

UNITED STATES PATENT OFFICE

FRANK OSCAR LEVI CHORLTON, OF BURY, ENGLAND

VARIABLE-SPEED DRIVE

Application filed January 22, 1929, Serial No. 334,327, and in Great Britain January 5, 1929.

The invention is for a variable-speed drive suitable for mechanical group driving, such as the driving of the sections of a paper-making machine.

In such-like machines the control or reduction of speeds of the individual sections independently of others of a group is of practical importance.

In the epicyclic gear illustrated a minor portion only of the applied power and solely for controlling the gear ratio, is transmitted from and through a belt-pair, one element of which is attached to the driving shaft, and the other to a counter-shaft in gear connection with the ratio-controlling parts of the epicyclic.

Reduction or change of speed is determined by the limiting conditions of the moving belt-pair, and the object of the present invention is primarily to enable reduction of speed of a particular section of a group of driving units to be attained below that possible with the use of a belt-pair alone.

For this purpose, I arrange for the driving element of the epicyclic gear described to be capable of non-movement in relation to the driving shaft in manner and with the result to be stated, instead of allowing said driving element to be constantly rotating with the driving shaft as in the case of the patent herein named.

I may also provide means for reversing motions when required, and while said driving element is stationary, by gearing to be described at the countershaft provided in two parts for the purpose.

With reference to the accompanying drawings, Fig. 1 shows a known form of belt-pair suitable for the gear herein mentioned, and which may be substituted for that employed in Fig. 2, which latter figure is a sectional elevation of a variable-speed drive arranged to one form of my invention. Fig. 3 is a detail relative to said Fig. 2.

Fig. 4 is an end section of a part of Fig. 5, the latter figure showing on an enlarged scale a detail in Fig. 2.

$a$. is the main driving shaft coupled at $b$. to a shaft from a source of power.

$c$. is a gear wheel or driving element of the epicyclic gear when the same is in normal use. The major portion of the power at such times passes through $c$., gearing pinions $d$. revolubly mounted in a gear box $e$. (the latter revolubly mounted about shaft $a$.) to the driven element $h$., on shaft $a$., which latter element forms part of a sleeve $k$. capable of being rigidly connected to an extension of sleeve $m$. by means of a clutch shown at $n$. A worm $o$. rigidly forming part of $m$. is shown engaging a wheel $r$. on the in-driving shaft $s$. of the mechanism or section being driven.

A minor portion of the applied power is normally transmitted through a belt-pair, such as shown in said Fig. 2 or may be as shown in Fig. 1 using the known form of expanding pulleys.

In Fig. 2 aforesaid, a cone pulley or one element of the belt-pair, is indicated at $u$. attached to shaft $a$. and connected by belt $v$. to the second cone pulley $w$. the latter attached to a counter shaft $x$. This counter shaft may be continuous from end to end, but in the present example it is divided into two parts for the purpose of illustrating the reverse-motion mechanism according to my invention, when said motion is desirable.

The second part of the countershaft is shown at $z$. It is connected by chain and chain wheels, shown at 1. and 2. respectively, for controlling the movement of the box $e$. of the epicyclic gear, as will be obvious. In Fig. 3 a vertical shaft 4 and bevel gearing 5 is shown as a substitute for the chain gear of Fig. 2.

According to my present invention, the shaft $a$. has provided upon it a sleeve 6. capable of longitudinal movement along said shaft. (See Figs. 4 and 5 more particularly).

The driving element $c$. is in connection with said sleeve 6. by means such as splines or a feather, such as shown at 7 in Fig. 5 or said sleeve is thus in slidable connection with element $c$. When the sleeve 6. is moved towards the left in the view named, it is capable of interlocking with shaft $a$. or of engaging at its ends with or between projections 8 on said shaft $a$. (Fig 5), at which period, shaft $a$. drives $c$. through the connections with 6. When the latter member is moved towards the right in the diagram, until disengagement from the projections 8 occurs, driving connection between c. and shaft a. ceases, and the member 6. is assumed to engage, at its opposite end, a fixed part or ring 9 in connection with the frame of the epicyclic thus preventing rotation of the element c. Under the last-named conditions the drive is solely through the belt-pair, the countershaft and the chain and wheel mechanism shown, assuming the countershaft parts x. and z. to be connected. Such slow motion, so introduced, in the case of a paper-making machine, is useful when examination or replacement of felts and wires is required. For freeing a blockage of paper in said machine, or like reason, it is convenient to be able to reverse the motion of the machine, and in the present instance, I employ means for this purpose in the following manner.

The shaft portion x. carries a bevel wheel 10 keyed thereon, while the shaft portion z. has another bevel wheel 11 freely mounted on the same. Said portion z. also carries a dog-clutch or the like 12 the latter capable of longitudinal movement along z. but in feather or sliding key connection therewith. The bevels 10 and 11 are in gear connection through a bevel wheel 13 revolubly mounted on the frame of the epicyclic arrangement shown.

Clutch 12 is capable of being slid along z. in the one direction or the other, and of engaging either of the bevels 10 and 11 according to the direction taken. In the position indicated in the drawings the clutch is in mid-position and therefore no motion is transmitted from x. to z. For such a condition or when the clutch is passed through such a position for reversal of motion desired, the element c. already referred to would be in the non-operative condition, or the sleeve 6 would be disengaged from the shaft a. and stationary. When the clutch 12 gears with wheel 10 the motion is in one direction, and when it engages wheel 11 the motion is in the reverse direction as will be obvious.

In either case, the slow motion arrangement with the use of sleeve 6 may be utilized as required.

I claim:—

In a variable-speed drive provided with a speed-varying belt pair driven from the driving shaft, a sleeve on said driving shaft and movable along the same, a positive driving element of said drive with which said sleeve is in slidable connection, and through which element the major portion of the power is transmitted, said element loosely mounted on said shaft, projections on said sleeve and projections on the driving shaft for the former to engage with the latter, and a stationary element engaged by said sleeve when the latter is disengaged from said shaft, for the purpose and as herein set forth.

In testimony whereof I have affixed my signature.

FRANK OSCAR LEVI CHORLTON.